(12) United States Patent
Hirsch

(10) Patent No.: US 10,934,987 B2
(45) Date of Patent: Mar. 2, 2021

(54) REMOTE STARTER ADAPTER FOR USE WITH A COMMUNICATION DEVICE

(71) Applicant: Bezalel Hirsch, Lakewood, NJ (US)

(72) Inventor: Bezalel Hirsch, Lakewood, NJ (US)

(*) Notice: Subject to any disclaimer, the term of this patent is extended or adjusted under 35 U.S.C. 154(b) by 97 days.

(21) Appl. No.: 16/185,844

(22) Filed: Nov. 9, 2018

(65) Prior Publication Data

US 2019/0162152 A1    May 30, 2019

Related U.S. Application Data

(60) Provisional application No. 62/590,424, filed on Nov. 24, 2017.

(51) Int. Cl.
| | | |
|---|---|---|
| *F02N 11/08* | (2006.01) | |
| *H04W 84/12* | (2009.01) | |
| *G08C 17/00* | (2006.01) | |

(52) U.S. Cl.
CPC ......... *F02N 11/0807* (2013.01); *H04W 84/12* (2013.01); *F02N 2300/306* (2013.01); *G08C 17/00* (2013.01)

(58) Field of Classification Search
CPC .......... F02N 11/0807; F02N 2300/306; F02N 2300/302; G08C 17/00; H04W 84/12; B60R 25/209
See application file for complete search history.

(56) References Cited

U.S. PATENT DOCUMENTS

| | | | | |
|---|---|---|---|---|
| 4,670,746 A | * | 6/1987 | Taniguchi ............. | B60R 25/246 180/287 |
| 4,804,956 A | * | 2/1989 | Boxall .................. | H04Q 11/04 340/2.21 |
| 5,305,459 A | * | 4/1994 | Rydel ....................... | G06F 1/32 235/375 |
| 5,349,931 A | * | 9/1994 | Gottlieb .............. | F02N 11/0807 123/179.2 |
| 5,371,734 A | * | 12/1994 | Fischer ............. | H04W 52/0274 370/311 |

(Continued)

OTHER PUBLICATIONS

NPL#1; "Sparkio-Remote-Car-Starter-WiFi-Activation-in-20-m_Published_12_31_2014"; retrieved from the internet Apr. 7, 2020; URL: http://www.instructables.com/id/Sparkio-Remote-Car-Starter-WiFi-Activation-in-20-m/; (Year: 2014).*

(Continued)

*Primary Examiner* — Sizo B Vilakazi
*Assistant Examiner* — Brian R Kirby
(74) *Attorney, Agent, or Firm* — Lowenstein Sandler LLP

(57) ABSTRACT

Implementations provide techniques for remote starter adapter for use with a communication device. In one implementation, a system comprising a memory and an adapter coupled, operatively coupled to the memory, having an interface to connect to a remote starter. The adapter is to receive, via a wireless connection, a probe request from a communication device, the probe request comprising a command data structure. It is determined whether to change a status of an indicator based on the command data structure. Responsive to changing the statue of the indicator, a signal associated with the adapter is generated. Thereupon, the signal is transmitted, via the interface, to an input circuit to activate the remote starter.

17 Claims, 5 Drawing Sheets

(56) References Cited

U.S. PATENT DOCUMENTS

| | | | | |
|---|---|---|---|---|
| 5,736,935 A * | 4/1998 | Lambropoulos | | B60R 25/04 |
| | | | | 123/179.2 |
| 6,140,938 A * | 10/2000 | Flick | | B60R 25/04 |
| | | | | 340/12.28 |
| 6,295,448 B1 * | 9/2001 | Hayes, Jr. | | G08C 17/02 |
| | | | | 340/12.5 |
| 6,421,354 B1 * | 7/2002 | Godlewski | | G08C 17/00 |
| | | | | 340/870.01 |
| 6,570,486 B1 * | 5/2003 | Simon | | B60R 25/04 |
| | | | | 307/10.2 |
| 9,062,617 B2 * | 6/2015 | Mauti, Jr. | | F02N 11/0807 |
| 9,744,941 B2 * | 8/2017 | Geissenhoner | | F02N 11/0807 |
| 2002/0101638 A1 * | 8/2002 | Zimmerman | | H04L 1/08 |
| | | | | 398/121 |
| 2002/0135408 A1 * | 9/2002 | Chiu | | H03K 5/135 |
| | | | | 327/145 |
| 2002/0146999 A1 * | 10/2002 | Witte | | B60R 25/252 |
| | | | | 455/345 |
| 2002/0186691 A1 * | 12/2002 | Bristow | | G07C 5/085 |
| | | | | 370/389 |
| 2004/0059478 A1 * | 3/2004 | Okuyama | | H04L 41/00 |
| | | | | 701/21 |
| 2005/0093674 A1 * | 5/2005 | Wackerl | | H04L 12/40006 |
| | | | | 340/5.8 |
| 2006/0061458 A1 * | 3/2006 | Simon | | B60R 25/10 |
| | | | | 340/426.35 |
| 2009/0163140 A1 * | 6/2009 | Packham | | H04L 67/02 |
| | | | | 455/41.2 |
| 2009/0325566 A1 * | 12/2009 | Bell | | H04W 4/029 |
| | | | | 455/419 |
| 2013/0279489 A1 * | 10/2013 | Calcev | | H04W 48/02 |
| | | | | 370/338 |
| 2014/0214241 A1 * | 7/2014 | Ramamoorthy | | H04W 4/40 |
| | | | | 701/2 |
| 2015/0073685 A1 * | 3/2015 | Choi | | B60H 1/00657 |
| | | | | 701/113 |
| 2015/0379859 A1 * | 12/2015 | Nespolo | | G08B 21/24 |
| | | | | 340/539.32 |
| 2016/0177908 A1 * | 6/2016 | Hirose | | F02N 11/0807 |
| | | | | 123/179.2 |
| 2016/0294855 A1 * | 10/2016 | Maeda | | H04L 63/1425 |
| 2016/0368507 A1 * | 12/2016 | Geissenhoner | | B60R 25/24 |
| 2017/0140641 A1 * | 5/2017 | Flick | | B60R 25/24 |
| 2017/0164416 A1 * | 6/2017 | Yeddala | | H04W 36/30 |
| 2017/0255197 A1 * | 9/2017 | Vonasek | | H04L 67/12 |
| 2017/0257750 A1 * | 9/2017 | Gunasekara | | H04W 4/06 |
| 2017/0346934 A1 * | 11/2017 | Dentamaro | | H04M 1/6091 |
| 2018/0060251 A1 * | 3/2018 | You | | G06F 13/4282 |

OTHER PUBLICATIONS

Gupta, Vishal & Rohil, Mukesh. (2013). Bit-Stuffing in 802. 11 Beacon Frame: Embedding Non-Standard Custom Information. International Journal of Computer Applications. 63. 6-12. 10.5120/10436-5115.; Retreived Oct. 21, 2020; https://research.ijcaonline.org/volume63/number2/pxc3885115.pdf (Year: 2013).*

NPL#1; "Sparkio-Remote-Car-Starter-WiFi-Activation-in-20-m_Published_Dec. 31, 2014"; retrieved from the internet Apr. 7, 2020; URL: http://www.instructables.com/id/Sparkio-Remote-Car-Starter-WiFi-Activation-in-20-m/; (Year: 2014).*

NPL#2; "Spark_Core_Microcontroller_Datasheet_NPL_PublishedNov. 2014"; retrieved from the internet Apr. 7, 2020; URL: https://www.codeproject.com/Articles/840416/Stage-Getting-started-with-Spark-Core (Year: 2014).*

NPL#3; "802.11_WIFI_NetworkDiscovery_ProbeRequest_Promiscuous_Mode_Published_Jan. 29, 2015"; retrieved from the internet Apr. 7, 2020; URL:https://ieeexplore.ieee.org/document/7024474 (Year: 2015).*

NPL#4; "IoT_Based_Keyless_Start_Published_Jun. 20, 2017"; retrieved from the internet Apr. 7, 2020; URL: https://www.instructables.com/id/10-IoT-Based-Key-Less-Bike-Control/ (Year: 2017).*

* cited by examiner

REMOTE STARTER ADAPTER FOR USE WITH A COMMUNICATION DEVICE

CROSS-REFERENCE TO RELATED APPLICATION

This application claims the benefit of priority from U.S. Provisional Application No. 62/590,424, filed Nov. 24, 2017, the entirety of which is incorporated herein by reference.

TECHNICAL FIELD

This disclosure is generally related to field of remote starters, and is more specifically related to a remote starter adapter for use with a communication device.

BACKGROUND

There are currently several remote automobile starter units on the market. Each of these products allows the user to start an automobile by remote control. The remote automobile starters currently on the market, however, suffer from various drawbacks. One such drawback is that the many of these remote automobile starters are not available as a phone application without requiring communication with a service at an ongoing subscription fee that can be very expensive over time.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

The present disclosure is illustrated by way of examples, and not by way of limitation, and may be more fully understood with references to the following detailed description when considered in connection with the figures, in which.

DETAILED DESCRIPTION

Figure 1:
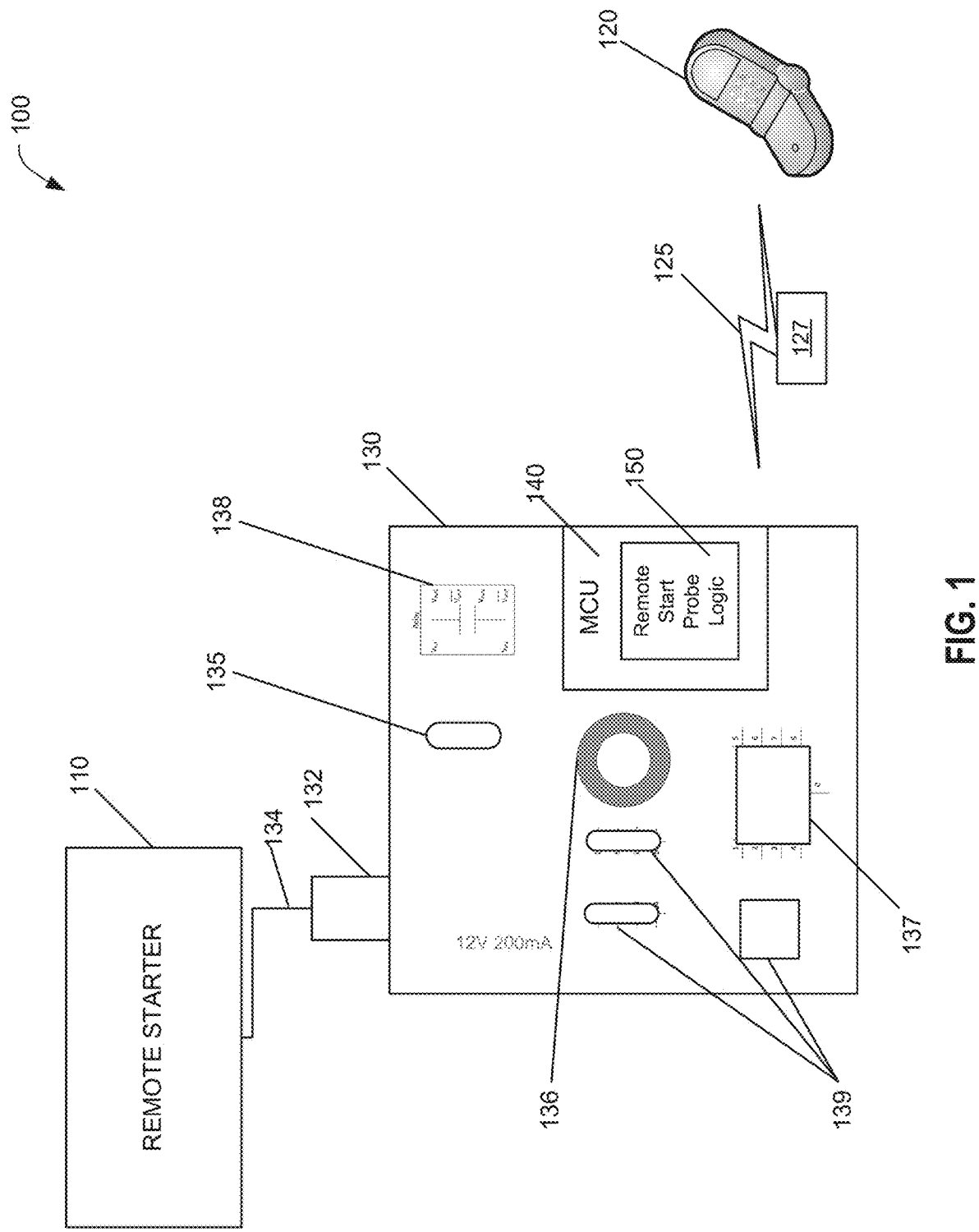
FIG. 1 depicts a pictorial diagram of a system including a remote starter adapter for use with a communication device in accordance with implementations of the disclosure.

Described herein are techniques for activating a remote starter via a Wi-Fi (Wireless Fidelity) capable communication device, such as a smartphone. The techniques disclosed herein provide an adapter that can be attached to a remote starter so that the communication device may directly activate the starter without communicating with an online service. It is contemplated that the systems and methods of the adapter as described herein may operate with several types of secondary device for activating certain types of electronic components. These secondary devices may include, but are not limited to, a remote starter. For ease of illustration, a remote starter is described herein as the primary use. However, other use cases are also envisioned. Moreover, so as to illustrate the adapter functionality and corresponding processes for remotely activating the remote starter, and not by way of limitation, the adapter described herein is discussed in conjunction with a remote starter for starting an engine of a vehicle, such as an automobile.

In one implementation, to activate a remote starter via a communication device, the adapter of the disclosure uses a "bit stuffing" technique. In data transmission, "bit stuffing" can refer to the insertion of one or more bits (e.g., the smallest unit of data in a computer) into a transmission stream of data to provide signaling information to a receiver. The receiver (which in the case is the adapter) is configured to detect and utilize the bits "stuffed" (e.g., inserted) into the transmission stream. An advantage of using bit stuffing is that it provides a lower operational overhead and longer range of transmitting data as compared to traditional Wi-Fi communication techniques. For example, communication via Wi-Fi involves a complex series of back-and-forth between two devices to establish a network connection. Then, after establishing the network connection between the devices, the actual communication is performed.

The techniques of the disclosure enable the adapter to receive, via a wireless connection (e.g., Wi-Fi), a probe request from a communication device to activate the remote starter. This probe request may include command data that is bit stuffed with one or more bits to signal the adapter. For example, the Wi-Fi capable communication device may transmit a probe request with the command data utilizing a type of application programming interface (API) (e.g., an Android™ API). In one implementation, the adapter may include a wireless network interface controller (WNIC) that is configured to operate in a "promiscuous mode," for example. In promiscuous mode, every data packet received by the WNIC can be read by the adapter. Typically, a WNIC rejects data packets not addressed to it, however, in promiscuous mode all data packets are accepted by the WNIC.

In one example, when the WNIC receives the command data from the probe request, the adapter can change the state of an indicator pin, such as a general-purpose input/output (GPIO) pin. For example, the adapter can include a GPIO pin to control and monitor various system resources of the adapter. When the status of indicator pin is changed (e.g., to a determined value), this triggers an internal electronic switch of the adapter to generate a signal. For example, the adapter may further include one or more electronic switches, such as a relay. The relay or other type of switch is configured to generate a signal, such as a ground electronic pulse, when the relay is closed. The ground pulse is then transmitted to an input wire (or circuit) of the remote starter which signals the starter to start the engine of a vehicle, for example, coupled thereto. For example, the remote starter includes a mechanism that allows it to be activated via a ground pulse on a specific wire, which is generally referred to as an activation input wire.

FIG. 1 depicts a pictorial diagram of a system 100 including a remote starter adapter for use with a communication device in accordance with implementations of the disclosure. As shown, the system 100 includes an adapter 130 operatively connected to remote starter 110 and a communication device 120. In some implementations, the communication device 120 may be a Wi-Fi capable device, such as mobile phone, personal data assistant (PDA), smartphone, laptop/netbook, tablet and the like. In some implementations, an application may be installed at the Wi-Fi capable communication device in order to obtain the benefits of the techniques described herein. In an implementation, all or a portion of the application may be downloaded from a service to the communication device. For example, a user may elect to download the application from a service associated with an online server or it may be pre-loaded on the communication device. The application may allow the communication device 120 to transmit a probe request to the remote starter 110 via an API.

In some implementations, the remote starter 110 is an apparatus capable of starting an electronic component, such as a driving mechanism in a vehicle. The remote starter 110 may be coupled to one or more other components (e.g., ignition system) already installed in the vehicle. The remote starter 110 may be of various types of starters, such as an off-the-shelf starter that includes an input wire 134 operable to be connected to adapter 130. The input wire 134 is a specific wire of the remote starter 110 that is referred to as an activation input wire. In such cases, when this input wire 134 is activated (e.g., by providing an electronic pulse), this causes the remote starter 110 to start the vehicle.

Adapter 130 includes an interface 132 that is operable to be connected to the input wire 134 of the remote starter 110. The adapter 130 may be a type of circuit board, such as printed circuit board (PCB) used in computer systems for interconnecting integrated circuits (ICs) chips and other electronic components and devices. The PCB is formed from a substrate supporting one or more conductive layers. The PCB mechanically supports and electrically connects electronic components or electrical components using conductive tracks, pads and other features etched from one or more sheet layers of copper laminated onto and/or between sheet layers of a non-conductive substrate. For example, the layers may include conductive tracks connected as a ground plane and a power plane. Integrated circuits (e.g., general-purpose input/output (GPIO) pin 135) (e.g., relay 138) as well as other circuits 139) and electronic components (e.g., microcontroller unit 140) are mounted on a surface of the printed circuit board and selectively connected using the conductive tracks (not shown).

In some implementations, the adapter 130 includes a port 136 for securing the adapter from certain movement or external vibrations when the vehicle is moved or in the process of moving. For example, the adapter 130 may be mounted to a housing (not shown) by using a type of fastener in conjunction with port 136. The housing may be used to protect and secure the adapter 130 when the system 100 is installed in the vehicle.

To facilitate activating the remote starter 110, the adapter 130 may include processing logic (e.g., remote start probe logic 150). In one implementation, the remote start probe logic 150 may comprise hardware (circuitry, dedicated logic, etc.), software (e.g., software, or a combination of thereof). The remote start probe logic 150 may include instructions that are installed in memory of the adapter 130. These instructions can be executed by a processing device, such as MCU 140. The remote start probe logic 150 is configured to signal the remote starter 110 to start responsive to the adapter 130 being activated by the communication device 120. For example, when the adapter 130 receives start command data from the communication device 120, the remote start probe logic 150 may change the state of an indicator pin, such as GPIO pin 135. When the status of GPIO pin 135 is changed (e.g., to a certain value representing a high value), this triggers relay 138 to generate a signal, such as such as a ground electronic pulse. When the relay 138 closes, the ground electronic pulse is then transmitted to the input wire 134 via interface 132. In turn, this ground electronic pulse on the input wire 134 signals the remote starter 110 to start the engine of the attached vehicle.

To activate the remote starter 110, the adapter 130 may receive a type of probe request 127 from a Wi-Fi capable device, such as communication device 120. For example, the adapter 130 may include a wireless network interface controller (WNIC) 137 that is configured to operate in "promiscuous mode", for example. "Promiscuous mode" may refer to a mode where every data packet received by the WNIC 137 can be read by the adapter 130. Other terminology may be used to refer to this particular mode. In promiscuous mode, the WNIC 137 receives a probe request 127 via a wireless connection 125 (e.g., Wi-Fi) associated with the communication device 120. This probe request 137 may include command data that is bit stuffed (discussed further below with respect to FIG. 2) with one or more bits to signal the adapter 130. For example, the communication device 120 may transmit the probe request 127 with the command data utilizing a type of application programming interface (API) (e.g., an android API). The command data of the probe request 137 is used by the remote start probe logic 150 to determine whether the adapter 130 should active the remote starter 110. Further aspects of the probe request 127 are discussed with reference to FIG. 2

Figure 2:
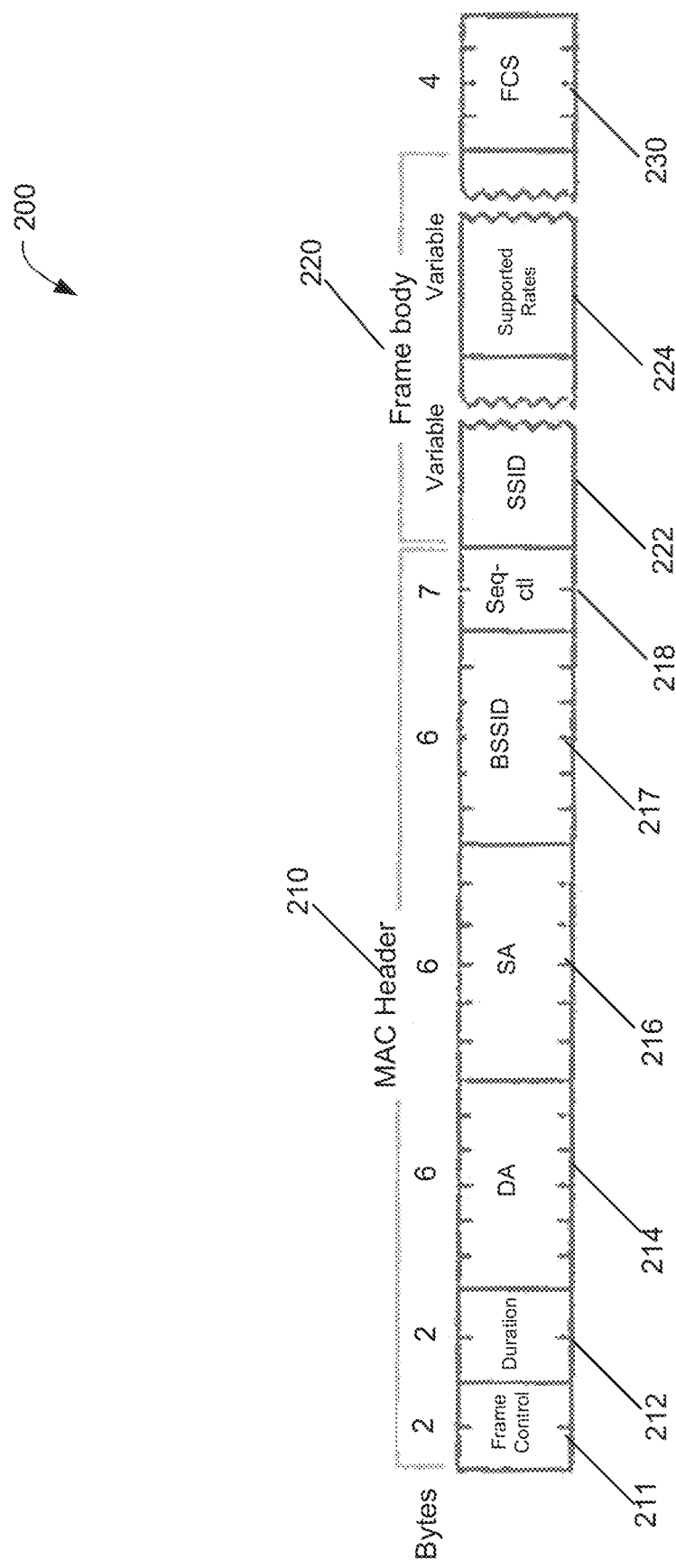
FIG. 2 depicts a probe request in accordance with implementations of the disclosure.

FIG. 2 depicts a probe request 200 in accordance with implementations of the disclosure. In this example, the probe request 200 may be the same as probe request 127 of FIG. 1. The probe request 200 is a data frame in a transmission stream of data, for example, from communication device 120. In some implementations, the probe request 200 can be "bit stuffed" with data, such as a start command. Bit stuffing refers to the insertion of one or more bits (e.g., the smallest unit of data in a computer) into a transmission stream of data as a way to provide signaling information to a receiver (e.g., adapter 130). The adapter 130 is configured to detect and utilize the bits stuffed into the transmission stream to activate the remote starter 110. An advantage of using bit stuffing is that it provides lower operating cost and a longer range of transmitting data over traditional Wi-Fi communication techniques.

As shown in FIG. 2, the probe request 200 includes multiple fields that include a mac header 210, a frame body 220 and a frame check sequence (FCS) field 230 along with other fields. In some implementations, the MAC header 210 includes a frame control field 211, a duration field 212, multiple address fields 214-216, a basic service set identifier field (BSSID) 217 and a sequence control field 218. The frame body 220 includes a service set identifier field (SSID) 222 that includes the name of the Wi-Fi network and supported rates 224.

Figure 3:
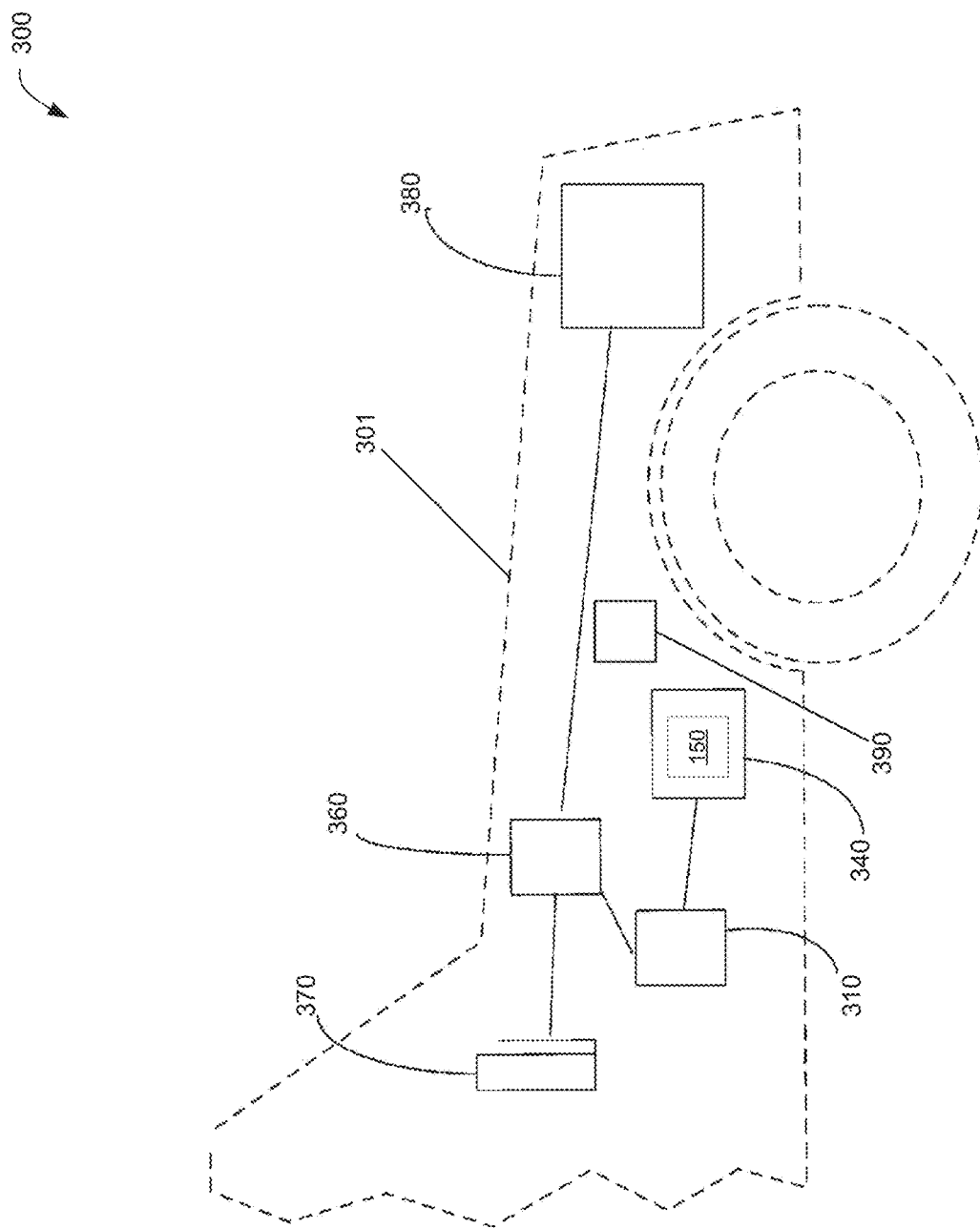
FIG. 3 depicts a pictorial diagram of a system including a remote starter adapter deployed in a vehicle in accordance with implementations of the disclosure.

FIG. 3 depicts a pictorial diagram of a system 300 including a remote starter adapter 340 deployed in a vehicle 301 (e.g., an automobile) in accordance with implementations of the disclosure. In this example, the system 300 includes a remote starter 310 (which may be the same as remote starter 110 of FIG. 1.) attached to a remote starter adapter 340 (which may be the same as adapter 130) that is deployed in an automobile, e.g., vehicle 301. For example, the remote starter adapter 340 includes the remote start probe logic 150 that is configured to signal the remote start 110 to start when the adapter 130 is activated by the communication device 120.

The remote starter 310 may start a driving mechanism in the vehicle 301 based on a command signal received from remote starter adapter 340. For example, the remote starter 110 may be attached to an ignition system 360 of the vehicle 301, which is cable of initiating engine 380. The ignition system 360 may also be attached to the steering component 370 to operate the vehicle 301 when the engine 380 is started. To power the remote starter adapter 340, the adapter may be attached to a power supply 390, such as an automotive car battery, of vehicle 301. In some implementations, the remote starter adapter 340 may be powered by using a power supply 390 other than one associated with vehicle 301. For example, the remote starter adapter 340 can be powered by power supply 390, such as a removal/replaceable battery, installed in or around the housing of the remote starter adapter 340. If the remote starter 110 is powered by a separate battery which is not the car battery, the remote starter adapter 340 may be connected to ground from the adapter 340 rather than from the car.

In some implementations, the remote starter adapter 340 is configured to operate in "promiscuous mode" where every data packet received, for example, from communication device 120 can be read by the adapter 340. When the remote starter adapter 340 receives a data packet comprising a probe request from the communication device 120, the adapter 340 changes the state of an indicator pin, such as a general-purpose input/output (GPIO) pin, to a value. When the status of indicator pin of the adapter 340 is changed, the adapter triggers one or more electronic switches, such as a relay, to close. In turn, the closing of the relay causes it to generate a ground pulse. This ground pulse is then transmitted to the remote starter 310 which signals the remote starter 310 to activate the driving mechanism of vehicle 301. The operator can then get in the vehicle and drive the vehicle 301 away.

Figure 4:
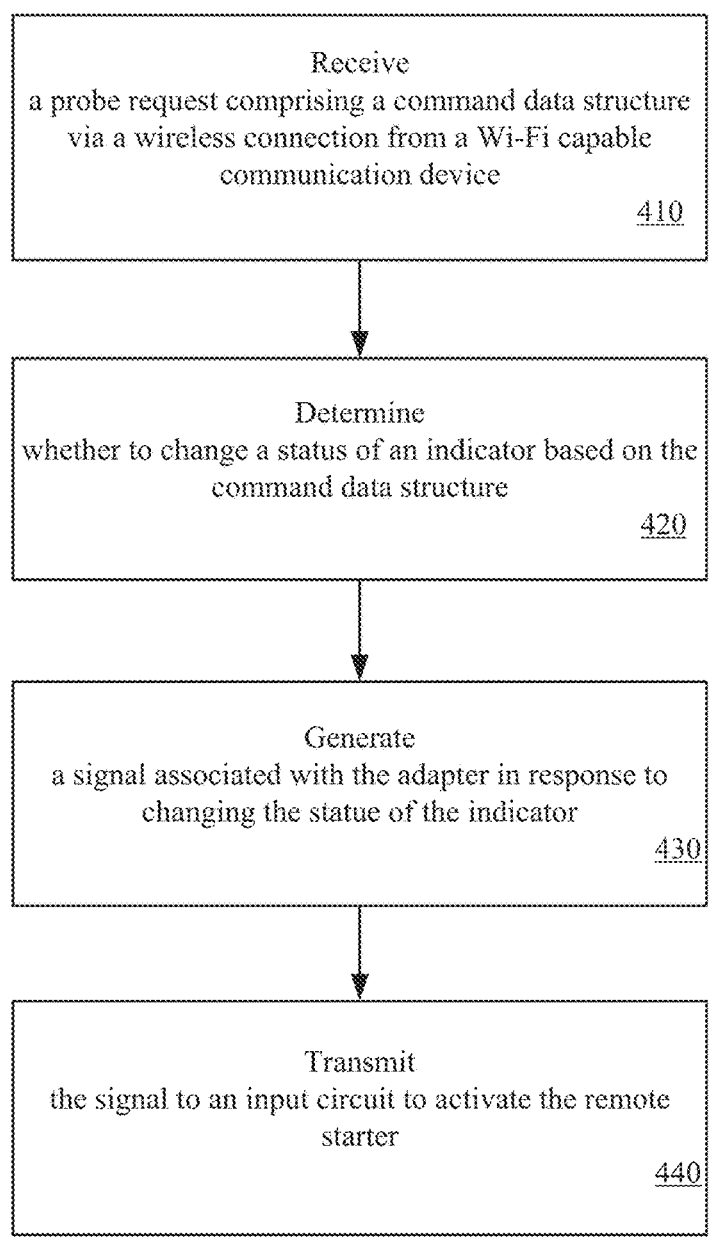
FIG. 4 depicts a flow diagram of a method of utilizing a remote starter adapter in conjunction with a communication device in accordance with one or more aspects of the disclosure.

FIG. 4 depicts a flow diagram of a method 400 of utilizing a remote starter adapter 130 in conjunction with a communication device (such as communication device 120 of FIG. 1) in accordance with one or more aspects of the disclosure. In one implementation, a processing device of system 100 of FIG. 1, such as the microcontroller unit (MCU) 140 of adapter 130, may perform method 400. The method 400 may be performed by processing logic (e.g., remote start probe logic) that may comprise hardware (circuitry, dedicated logic, etc.), software (e.g., software executed by a general purpose computer system or a dedicated machine), or a combination of both. In alternative implementations, some or all of the method 400 may be performed by other components of the system 100. It should be noted that blocks depicted in FIG. 4 can be performed simultaneously or in a different order than that depicted.

Method 400 begins at block 410 where an adapter receives a probe request from a communication device. This probe request comprises a command data structure. In some implementations, the adapter comprises an interface operable to be connected to a remote starter. In block 420, it is determined whether to change a status of an indicator, such as a general purpose input/output (GPIO) pin, based on the command data structure. Responsive to changing the statue of the indicator, a signal is generated in block 430, for example, by closing a relay associated with the adapter. Thereupon, the signal is transmitted in block 440 to an input circuit (wire) to activate the remote starter.

Figure 5:
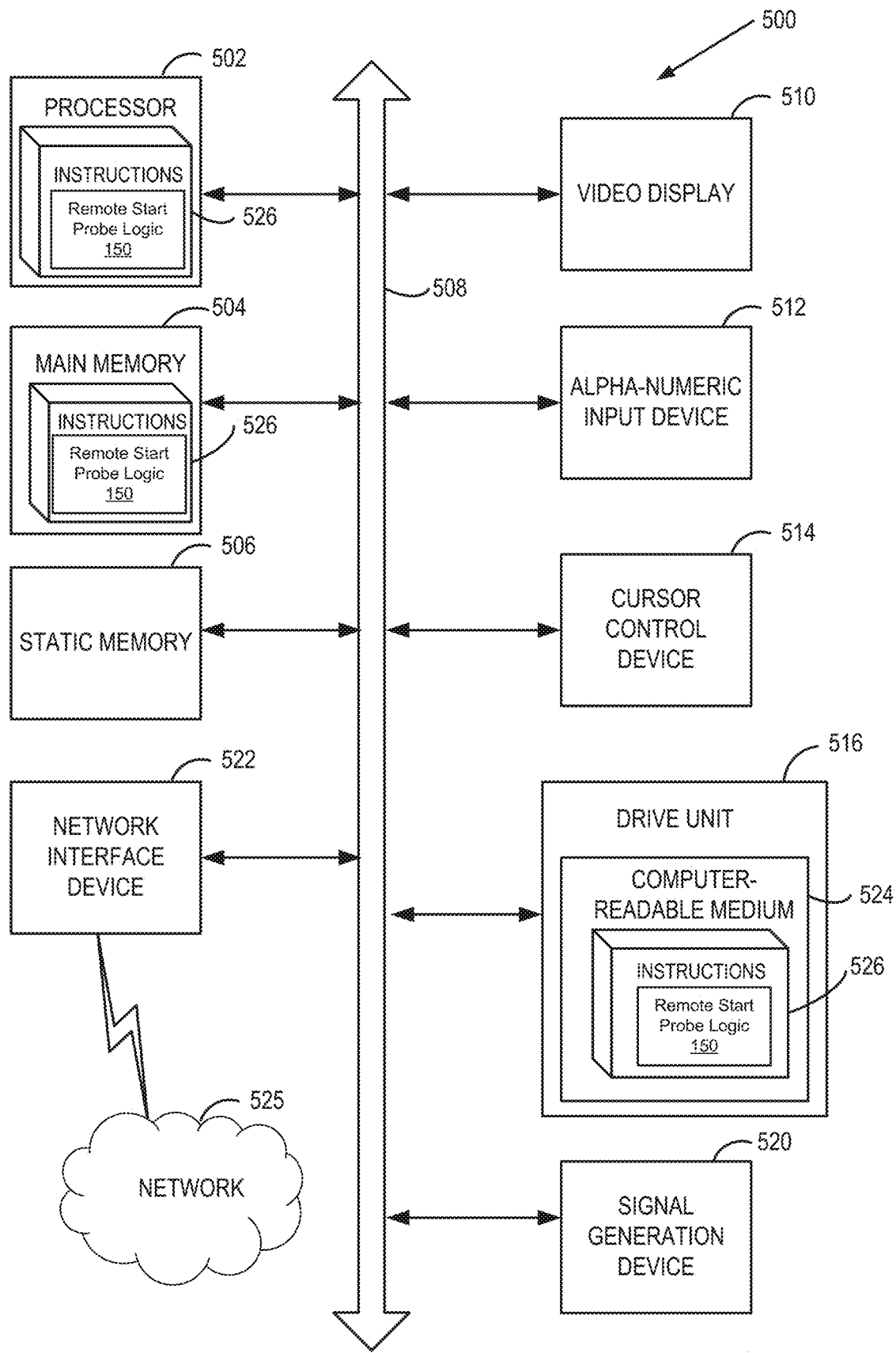
FIG. 5 depicts a block diagram of an example computer system operating in accordance with implementations of the disclosure

FIG. 5 depicts an example computer system 500 which can perform any one or more of the methods described herein. In one example, computer system 500 may correspond to system 100 of FIG. 1 to support a remote starter adapter for use with a communication device as disclosed herein. The computer system may be connected (e.g., networked) to other computer systems in a local area network (LAN), an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing system (processor) 502 (which may be the same as the MCU 140 of FIG. 1, a main memory 604 (e.g., read-only memory, flash memory, dynamic random access memory (DRAM) such as synchronous DRAM (SDRAM)), a static memory 506 (e.g., flash memory, static random access memory (SRAM)), and a drive unit 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions that may include instructions to execute instructions 526 for performing the operations and steps discussed herein. For example, in one implementation, the instructions 526 may perform the methods of flow diagram 300 of FIG. 3, flow diagram 400 of FIG. 4.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The drive unit 516 or secondary memory may include a non-transitory computer-readable medium 524 on which is stored one or more sets of instructions 526 (e.g., instructions for the instructions 526) embodying any one or more of the methodologies or functions described herein. For example, the instructions may include remote start probe logic 150 to implement method 400 of the disclosure. Instructions for the instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522. The instructions 526 may further be transmitted or received over a network 525 via the network interface device 522.

The non-transitory computer-readable storage medium 524 may also be used to store the instructions 526 persistently. While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the disclosure. The term "computer-readable storage medium" shall accordingly be taken to include, but not be limited to, non-transitory computer-readable storage mediums, solid-state memories, optical media, and magnetic media.

The instructions 526, components and other features described herein can be implemented as discrete hardware components or integrated in the functionality of hardware components such as ASICs, FPGAs, DSPs or similar devices. In addition, the instructions 526 can be implemented as firmware or functional circuitry within hardware devices. Further, the instructions 526 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 525 from which it may receive and provide relevant information regarding geometries.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "generating", "transmitting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, compact disk read only memories (CD-ROMs), and magnetic-optical disks, read-only memories (ROMs), random access memories (RAMs), erasable programmable read-only memories (EPROMs), electrically erasable programmable read-only memories (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:
a memory to store probe processing logic; and
an adapter, operatively coupled to the memory, having an interface to connect to a remote starter, the adapter is configured to:
receive, via a wireless connection, a probe request from a communication device, the probe request comprising a command data structure comprising a plurality of data fields in which at least one of the plurality of data fields is bit stuffed with a start command to indicate whether to activate the remote starter;
determine whether to change a status of an indicator based on the command data structure;
responsive to changing the status of the indicator, generate a signal associated with the adapter; and
transmit, via the interface, the signal to an input circuit to activate the remote starter.

2. The system of claim 1, further comprising a network interface coupled to the adapter, the network interface configured to operate in a promiscuous mode to receive the probe request.

3. The system of claim 2, wherein the adapter is configured to read data packets received by the network interface, and wherein in the promiscuous mode every data packet received by the network interface can be read by the adapter.

4. The system of claim 1, wherein the adapter is further configured to set the status of the indicator to a value.

5. The system of claim 1, wherein the signal is a ground pulse.

6. The system of claim 1, wherein the remote starter is coupled to a vehicle.

7. The system of claim 6, wherein the adapter is further configured to, responsive to the remote starter being activated, start an engine of the vehicle.

8. A method comprising:
receiving, by a processing device via a wireless connection, a probe request from a communication device, the probe request comprising a command data structure comprising a plurality of data fields in which at least one of the plurality of data fields is bit stuffed with a start command to indicate whether to activate a secondary device;
determining, by the processing device, whether to change a status of an indicator based on the command data structure;
responsive to changing the status of the indicator, generating, by the processing device, a signal associated with an adapter; and
transmit, by the processing device via an interface of the adapter, the signal to an input circuit to activate the secondary device.

9. The method of claim 8, further comprising operating a network interface coupled to the adapter in promiscuous mode to receive the probe request.

10. The method of claim 9, wherein the adapter is configured to read data packets received by the network interface, and wherein in the promiscuous mode every data packet received by the network interface can be read by the adapter.

11. The method of claim 8, further comprising setting the status of the indicator to a value.

12. The method of claim 8, wherein the signal is a ground pulse.

13. The method of claim 8, wherein the secondary device is a remote starter.

14. The method of claim 13, wherein the remote starter is coupled to a vehicle, and wherein the method further comprising, responsive to the remote starter being activated, starting an engine of the vehicle.

15. A non-transitory computer-readable storage medium comprising executable instructions that when executed, by a processing device of an adapter, cause the processing device to:
receive, by the processing device via a wireless connection, a probe request from a communication device, the probe request comprising a command data structure comprising a plurality of data fields in which at least one of the plurality of data fields is bit stuffed with a start command to indicate whether to activate a remote starter;
determine whether to change a status of an indicator based on the command data structure;
responsive to changing the status of the indicator, generate a signal associated with the adapter; and
transmit, via an interface of the adapter, the signal to an input circuit to activate the remote starter.

16. The non-transitory computer-readable storage medium of claim 15, wherein the processing device is further configured to set the status of the indicator to a value.

17. The non-transitory computer-readable storage medium of claim 15, wherein the signal is a ground pulse.

* * * * *